(12) United States Patent
Kang et al.

(10) Patent No.: US 9,334,359 B2
(45) Date of Patent: May 10, 2016

(54) METHOD FOR CONTINUOUSLY PREPARING BIODEGRADABLE ALIPHATIC/AROMATIC POLYESTER COPOLYMER

(71) Applicants: SAMSUNG FINE CHEMICALS CO., LTD., Ulsan (KR); S-ENPOL CO., LTD., Wonju-si, Gangwon-do (KR)

(72) Inventors: Gyung Don Kang, Daejeon (KR); Ki Chull Yun, Cheonan-si (KR); Sang Yob Kim, Goyang-si (KR); Jung Ryum, Kim, Seoul (KR); Boo Seong Kim, Seoul (KR); Kil Seuk Byun, Yongin-si (KR); Sei Hoon Kim, Wonju-si (KR); Sung Bae Park, Incheon (KR)

(73) Assignees: LOTTE FINE CHEMICAL CO., LTD. (KR); S-ENPOL CO., LTD. (KR)

( * ) Notice: Subject to any disclaimer, the term of this patent is extended or adjusted under 35 U.S.C. 154(b) by 0 days.

(21) Appl. No.: 14/423,293

(22) PCT Filed: May 20, 2013

(86) PCT No.: PCT/KR2013/004388
§ 371 (c)(1),
(2) Date: Feb. 23, 2015

(87) PCT Pub. No.: WO2014/038773
PCT Pub. Date: Mar. 13, 2014

(65) Prior Publication Data
US 2015/0252142 A1 Sep. 10, 2015

(30) Foreign Application Priority Data
Sep. 4, 2012 (KR) .................. 10-2012-0097878

(51) Int. Cl.
C08G 63/02 (2006.01)
C08G 63/16 (2006.01)
C08G 63/78 (2006.01)
C08G 63/20 (2006.01)
C08G 64/00 (2006.01)

(52) U.S. Cl.
CPC ............. *C08G 63/16* (2013.01); *C08G 63/20* (2013.01); *C08G 63/78* (2013.01)

(58) Field of Classification Search
CPC .............................. C08G 63/82; C08G 63/85
USPC .......................... 528/271, 272, 279
See application file for complete search history.

(56) References Cited

U.S. PATENT DOCUMENTS

2002/0006973 A1 * 1/2002 Itoh ................ C08G 63/16
521/48

FOREIGN PATENT DOCUMENTS

| CN | 101643946 A | 2/2010 |
|---|---|---|
| CN | 101935391 | 1/2011 |
| JP | 2002-105184 | 4/2002 |
| KR | 1020050045655 A | 5/2005 |
| KR | 1020080058025 A | 6/2008 |
| KR | 1020110007185 A | 1/2011 |
| KR | 1020110007186 A | 1/2011 |
| KR | 1020110008054 A | 1/2011 |
| WO | 2009118377 A1 | 10/2009 |
| WO | 2009127555 A1 | 10/2009 |
| WO | 2009127556 A1 | 10/2009 |

OTHER PUBLICATIONS

HADO Co., Ltd., Copyright 2010 p. 1 of 1, http://www.hado.co.kr/default1.html.
Hitachi Infrastructure Systems, Hitachi, Ltd. 1994, 2015, p. 1 of 2, http://www.hitachi-pt.conn/products/ip/element_technology/simulation.html (cite re-directs to http://www.hitachi.com/businesses/infrastructure/index.html).
Written Opinion for International Application No. PCT/KR2013/004388 dated Aug. 21, 2013.
International Search Report for International Application No. PCT/KR2013/004388 dated Aug. 21, 2013.
State Intellectual Property Office, Office Action dated Oct. 28, 2015 for Chinese Patent Application No. 201380045963.7, Chinese language, 6 pages.

* cited by examiner

*Primary Examiner* — Terressa Boykin
(74) *Attorney, Agent, or Firm* — Fitch Even Tabin & Flannery LLP

(57) ABSTRACT

Provided is a method of continuous production of a biodegradable aliphatic polyester including continuously performing an esterification reaction of a mixture including an aliphatic dihydroxy compound and aliphatic dicarboxylic acid at a temperature of 185° C. or less to obtain an ester; continuously performing a first polycondensation reaction of the ester to obtain a preliminary polymer; and continuously performing a polycondensation reaction of the preliminary polymer. According to the method of production, an amount of the aliphatic dihydroxy compound used decreases, which is a starting material, thereby decreasing the manufacturing cost of the biodegradable aliphatic polyester.

8 Claims, No Drawings

METHOD FOR CONTINUOUSLY PREPARING BIODEGRADABLE ALIPHATIC/AROMATIC POLYESTER COPOLYMER

TECHNICAL FIELD

The inventive concept relates to a method of continuous production of biodegradable aliphatic polyesters, and more particularly, to a method of continuous production of biodegradable aliphatic polyesters by using aliphatic dicarboxylic acids and aliphatic dihydroxy compounds.

BACKGROUND ART

As conventional non-degradable plastics such as nylons, polyethylene terephthalate, polypropylene, and polyethylene, are recognized as the primary cause of environmental pollutions, biodegradable polyesters are materials on the spotlight for environmental protection purposes and the like. The biodegradable polyesters may be prepared by a batch production method or a continuous production method.

In the batch production method, a relatively long residence time at a high temperature is needed to achieve an intrinsic viscosity and a molecular weight of a desired polyester; a partially heterogeneous reaction may occur even in a reactor, and properties of the polyester may be different at the initial, intermediate, and latter stages of a discharge process after the completion of the reaction. In this regard, when the biodegradable polyesters reside at a high temperature for a long period of time, the biodegradable polyesters may hydrolyze due to heat, which may affect mechanical strength and hydrolysis-resistant properties of the biodegradable polyesters and which may cause a quality difference due to the partially heterogeneous reactions and different discharge time.

On the other hand, the continuous production of the biodegradable polyesters has the advantages of inhibiting hydrolysis of the biodegradable polyesters caused by heat that occurs in the batch production method, mass-producing the biodegradable polyesters, and continuously obtaining products with a uniform quality.

When preparing the biodegradable polyesters, diols such as 1,4-butanediol are generally used as aliphatic dihydroxy compounds.

However, there are many rooms for improvements to the current use of 1,4-butanediol because 1,4-butanediol changes into tetrahydrofuran during a reaction and often causes problems in a vacuum line of a manufacturing device, and because an excess quantity of 1,4-butanediol is also needed.

DETAILED DESCRIPTION OF THE INVENTIVE CONCEPT

Technical Problem

The inventive concept provides a method of continuous production of biodegradable aliphatic polyesters.

Technical Solution

According to an aspect of the inventive concept, there is provided a method of continuous production of a biodegradable aliphatic polyester, the method including:

continuously performing an esterification reaction of a mixture including an aliphatic dihydroxy compound and aliphatic dicarboxylic acid at a temperature of 185° C. or less to obtain an ester;

continuously performing a first polycondensation reaction of the ester to obtain a preliminary polymer; and continuously performing a polycondensation reaction of the preliminary polymer.

Advantageous Effects

When a method of continuous production of biodegradable aliphatic polyester is used, an amount of byproducts generated from aliphatic dihydroxy compounds decreases, which are starting materials, thereby decreasing an amount of aliphatic dihydroxy compounds used. Accordingly, a manufacturing cost of the biodegradable aliphatic polyester decreases.

Best Mode

Provided is a method of continuous production of a biodegradable aliphatic polyester including continuously performing an esterification reaction of a mixture including an aliphatic dihydroxy compound and aliphatic dicarboxylic acid at a temperature of 185° C. or less to obtain an ester, continuously performing a first polycondensation reaction of the ester to obtain a preliminary polymer, and continuously performing a polycondensation reaction of the preliminary polymer.

As described above, the esterification reaction of the aliphatic dihydroxy compound and the aliphatic dicarboxylic acid is performed at a temperature of 185° C. or less to effectively inhibit a side reaction in which an aliphatic dihydroxy compound such as 1,4-butanediol, which is a starting material, changes into tetrahydrofuran (THF).

The 1,4-butanediol changes into the THF most prominently in acidic conditions at a temperature of about 190° C. or greater. A reaction temperature of the esterification reaction is adjusted to 185° C. or less to inhibit and minimize the change of the 1,4-butanediol into the THF. Accordingly, the amount of 1,4-butanediol needed to prepare the biodegradable aliphatic polyester is remarkably decreased relative to the conventional method. Also, the method of continuous production of the biodegradable aliphatic polyester is desirable in terms of environmental protection because production of byproducts such as THF is inhibited, and the method reduces problems in a vacuum line caused by the byproducts, thereby improving the workability.

A temperature of the esterification reaction is about 160° C. to about 185° C., more specifically about 160° C., 175° C. or 185° C.

Examples of the aliphatic dihydroxy compound may include C2-C30 alkane diols, more specifically ethanediol, 1,2-propanediol, 1,3-propanediol, 1,2-butanediol, 1,4-butanediol, 1,5-pentanediol, 1,6-hexanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, or a mixture thereof.

The aliphatic dicarboxylic acid may be linear or branched aliphatic acids or derivatives thereof having 2 to 30 carbon atoms, preferably 4 to 14 carbon atoms.

A cycloaliphatic dicarboxylic acid having 7 to 30 carbon atoms may be used as the aliphatic dicarboxylic acid.

Specific examples of the aliphatic dicarboxylic acid may include malonic acid, succinic acid, glutaric acid, 2-methyl glutaric acid, 3-methyl glutaric acid, adipic acid, pimelic acid, suberic acid, azelaic acid, sebacic acid, undecandioic acid, dodecandioic acid, brassylic acid, tetradecandioic acid, fumaric acid, 2,2-dimethylglutaric acid, maleic acid, itaconic acid, 2-5-norbornane dicarboxylic acid, or a mixture thereof.

Each of the aliphatic dihydroxy compound and the aliphatic dicarboxylic acid may be used with two or more different types of the above described compounds. When the two or more different types of compounds are used, the biodegradable aliphatic polyester obtained as a final product may be a copolymer having two or more types of different repeat units.

The copolymer may be an alternating copolymer, a random copolymer, or a block copolymer.

In the esterification reaction, an amount of the aliphatic dihydroxy compound used is about 1.1 mole to about 1.5 mole based on 1 mole of the aliphatic dicarboxylic acid. Thus, a production yield of ester is excellent even when a small amount of the aliphatic dihydroxy compound is used compared with the conventional method in which an amount of the aliphatic dihydroxy compound used is 2 moles or more based on 1 mole of the aliphatic dicarboxylic acid.

As used herein, the term "esterification reaction" includes a transesterification reaction in addition to the esterification reaction between the aliphatic dihydroxy compound and the aliphatic dicarboxylic acid.

The mixture including the aliphatic dihydroxy compound and the aliphatic dicarboxylic acid may further include at least one selected from a group consisting a catalyst, a heat stabilizer, a branching agent, a color stabilizing agent, and a color control agent.

The catalyst may be a metal containing compound including at least one metal selected from a group consisting lithium, magnesium, calcium, barium, cerium, titanium, zirconium, hafnium, vanadium, manganese, iron, cobalt, iridium, nickel, zinc, and tin.

The metal containing compound may be, for example, a metal organic acid salt, a metal alkoxide, a metal complex, a metal oxide, a metal hydroxide, a metal carbonate, a metal phosphate, a metal sulfate, a metal nitrate, or a metal chloride.

The catalyst may be, for example, a tetra-n-butyl titanate or a tetra-n-isopropyl titanate. When the catalyst is used, a production yield of the ester is excellent even at a temperature of 185° C. or less.

About 0.00001 mole to about 0.2 mole of the catalyst based on 1 mole of the dicarboxylic acid is used. When an amount of the catalyst used is within the range above, a production yield of a product of the esterification reaction is excellent.

When the amount of the catalyst used is less than 0.00001 mole, esterification reaction time may be longer and when the amount of the catalyst used exceeds 0.2 mole, a desired degree of polymerization may not be achieved because a depolymerization rate is accelerated during the latter stage of the polycondensation, and tensile strength/internal tearing strength or chromaticity may be decreased.

Triphenyl phosphate or the like may be used as the heat stabilizer. An amount of the heat stabilizer used herein is may be about 0.00001 mole to about 0.2 mole based on 1 mole of the aliphatic dicarboxylic acid, which is generally used in the art.

As the branching agent, a compound having three or more ester formable groups selected from among a carboxyl group, a hydroxyl group, and an amine group may be used. Specifically, the branching agent may be trimellitic acid, citric acid, maleic acid, glycerol, a monosaccharide, a disaccharide, dextrin, or a reduced sugar.

When the branching agent is used, a biodegradable aliphatic polyester copolymer having a high molecular weight may be easily prepared but, tensile strength/internal tearing strength may be decreased because a distribution of molecular weight is broad. Accordingly, the amount of the branching agent to be used needs to be controlled appropriately.

The amount of the branching agent used is about 0.00001 mole to about 0.2 mole based on 1 mole of the aliphatic dicarboxylic acid. When the amount of the branching agent used is within the range above, a high molecular weight biodegradable aliphatic polyester having an excellent tensile strength and internal tearing strength may be obtained.

The color control agent is an additive for controlling chromaticity of the biodegradable aliphatic polyester and non-limiting examples of the color control agent include cobalt acetate and the like. The color control agent may be added to a mixture including the aliphatic dihydroxy compound and the aliphatic dicarboxylic acid, but, the color control agent may even be added in a polycondensation process described below.

As the color stabilizing agent, phosphoric acid, phosphorus acid, triphenyl phosphite, triphenyl phosphate, trimethyl phosphate, sodium hypophosphite, or sodium phosphite may be used.

The amount of the color stabilizing agent used may be about 0.00001 mole to about 0.2 mole based on 1 mole of the aliphatic dicarboxylic acid herein.

A continuous polycondensation of the preliminary polymer occurs in multiple processes, for example, continuously performing a second polycondensation reaction of the preliminary polymer and continuously performing a third polycondensation reaction of a product obtained from the second polycondensation reaction.

The biodegradable aliphatic polyester according to an embodiment includes a repeat unit represented by Formula 1 below.

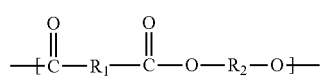

[Formula 1]

In Formula 1, $R_1$ and $R_2$ are each divalent $C_1$-$C_{30}$ aliphatic hydrocarbon groups.

A weight average molecular weight of the biodegradable aliphatic polyester is about 100,000 to about 300,000, for example, about 160,000 to about 280,000.

Examples of the aliphatic hydrocarbon groups of Formula 1 include a $C_1$-$C_{30}$ alkylene group, a $C_5$-$C_{30}$ cycloalkylene group, or a $C_4$-$C_{30}$ cycloheteroalkylene group.

Examples of $R_1$ and $R_2$ in Formula 1 include ethylene, propylene, and butylene.

Examples of the biodegradable aliphatic polyester include poly(1,4-butylene succinate), which is a compound having a repeat unit represented by Formula 2 below.

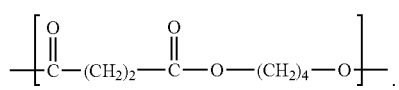

[Formula 2]

A method of manufacturing a biodegradable aliphatic polyester according to an exemplary embodiment will be described in detail.

First, aliphatic dihydroxy compounds and aliphatic dicarboxylic acids are agitated and mixed in a first slurry tank at a temperature of 50° C. to about 70° C. to prepare a slurry. The slurry is continuously flowed into a second slurry tank.

A catalyst may be added to the slurry.

An internal temperature of the second slurry tank is maintained in a range of about 70° C. to about 80° C.

[A Continuous Esterification Reaction]

The slurry in the second slurry tank is continuously introduced to an esterification reactor and an esterification reaction between an aliphatic dihydroxy compound and aliphatic dicarboxylic acid is performed under conditions of a temperature of 185° C. or less, for example, about 160° C. to about 185° C. and residence time of a reaction mixture of about 3 hours to about 8 hours. Here, a flow rate of the slurry introduced to the esterification reactor is for adjusting the residence time of reactants in the reactor and the flow rate may be adjusted according to a size of the reactor, but the flow rate is not limited to a specific range. For example, the flow rate may be about 20 kg/h to about 40 kg/h when a capacity of the first esterification reactor is about 0.49 $m^3$.

A pressure in the esterification reactor is adjusted to a normal pressure, which is in a range of 760±10 torr in the embodiment.

During the esterification reaction, at least one of a catalyst, a heat stabilizer, a branching agent, a color stabilizing agent, and a color control agent may be further added to a reaction mixture.

A level (a filling capacity of the reactor) and the flow rate may be adjusted such that the residence time of the reaction mixture is about 3 hours to about 8 hours.

By-product water of the esterification reaction may be removed through a condenser.

An acid value of the ester obtained from the esterification reaction may be about 50 mg KOH/g to about 80 mg KOH/g.

The esterification reactor is a suitable reactor for preparing an ester oligomer having a molecular weight in the ranges above and flow properties such as a viscosity and a melt index corresponding to the molecular weight. The reactor is well known in the field of polyester polymer synthesis, to which the inventive concept belongs. For example, a vertical reactor in which an agitator attached to a pitched paddle impeller (available from Hado Corp, Korea) is provided may be used. The reactor may form a resultant flow of an underflow and an axial flow to form an ideal flow pattern having improved agitation effects (http://www.hado.co.kr/default1.html).

[First Polycondensation Reaction]

A resultant product of the completed esterification reaction may be continuously introduced to a first polycondensation reactor and a first polycondensation reaction is performed to prepare a preliminary polymer. Here, a reaction temperature may be about 220° C. to 250° C. and a degree of vacuum may be about 10 torr to about 50 torr.

A level (a filling capacity of the reactor) and a flow rate may be adjusted such that residence time of a reaction mixture in the reactor may be about 1 hour to about 3 hours.

An acid value of a product of the first polycondensation reaction may be about 3 mg KOH/g to about 8 mg KOH/g and a weight average molecular weight of the product may be about 6,000 to about 10,000.

The first polycondensation reactor may be a suitable reactor for preparing a preliminary polymer having the molecular weight and a viscosity corresponding to the molecular weight. The reactor is well known in the field of polyester polymer synthesis, to which the inventive concept belongs. For example, a vertical reactor in which an anchor type agitator is provided, available from Hitachi Plant Technology, may be used. A flow rate may be adjusted to a range of, for example, about 20 kg/h to about 40 kg/h when a capacity of the first polycondensation reactor is about 0.4 $m^3$.

[A Second Polycondensation Reaction]

A preliminary polymer formed according to the first polycondensation reaction may be continuously introduced to a second polycondensation reactor to perform a second polycondensation reaction at a temperature of about 220° C. to about 250° C. Here, a degree of vacuum is about 2 torr to about 7 torr, a level (a filling capacity of the reactor) and a flow rate may be adjusted such that residence time of a reaction mixture in the reactor may be about 1 hour to 4 hours.

An acid value of the reaction product obtained according to the second polycondensation reaction may be about 5 mg KOH/g to about 8 mg KOH/g and a weight average molecular weight may be about 50,000 to about 140,000.

The second polycondensation reactor may be a suitable reactor for preparing a preliminary polymer having the molecular weight and flow properties such as a viscosity and a melt index corresponding to the molecular weight. The reactor is well known in the field of polyester polymer synthesis, to which the inventive concept belongs. For example, a horizontal-type reactor in which a single agitator is horizontally arranged, available from Hitachi Plant Technology, may be used. Here, a flow rate may be about 20 kg/h to about 40 kg/h when a capacity of the second polycondensation reactor is about 0.24 $m^3$ and a number of revolutions of the agitator may be about 1.5 rpm to about 8 rpm.

[A Third Polycondensation Reaction]

A product prepared from the second polycondensation reaction may be continuously introduced to a third polycondensation reactor and a third polycondensation reaction may be performed at a temperature of about 220° C. to about 250° C. Here, a degree of vacuum may be about 0.5 torr to about 2 torr.

A level (a filling capacity of the reactor) and a flow rate may be adjusted such that residence time of a reaction mixture in the third polycondensation reactor is about 1 hour to 3 hours.

A final polymer whose reaction is completed may be passed through a cooling water bath to be cooled and solidified, cut into a desired form by using a cutter, dried, transferred to a silo, and then charged to prepare a desired biodegradable aliphatic polyester.

An acid value of the biodegradable aliphatic polyester may be about 1.5 mg KOH/g to about 8 mg KOH/g and a weight average molecular weight may be about 150,000 to about 300,000, for example, about 160,000 to about 280,000.

The third polycondensation reactor may be a suitable reactor for preparing a preliminary polymer having the molecular weight and flow properties such as a viscosity and a melt index corresponding to the molecular weight. The reactor is well known in the field of polyester polymer synthesis, to which the inventive concept belongs. For example, a horizontal-type reactor in which two agitators are horizontally arranged, available from Hitachi Plant Technology, may be used. More specifically, the third horizontal-type polycondensation reactor of the Hitachi Plant Technology has two spectacle-shaped blades that are arranged horizontally parallel to each other. Here, a blade connected to each rotation axis passes through between the blade and another blade of another rotation axis to widen a surface area of high viscosity reaction mixture and induce an efficient reaction (http://www.hitachi-pt.com/products/ip/element_technology/simulation.html). Here, a flow rate may be about 20 kg/h to about 40 kg/h when a capacity of the third polycondensation reactor is about 0.192 $m^3$ and a number of revolutions of the agitator may be about 5 rpm to about 8 rpm.

During the first, the second, and the third polycondensation reactions, at least one of a color stabilizing agent, a color control agent, and a heat stabilizer may be further added to each reactor.

Phosphoric acid, phosphorous acid, triphenyl phosphite, triphenyl phosphate, sodium hypophosphite, or sodium phosphite may be used as the color stabilizer.

A biodegradable aliphatic polyester according to an embodiment is useful as a film, a sheet, a fiber, or materials for other molded products.

MODE OF THE INVENTIVE CONCEPT

Hereinafter, the inventive concept is described with reference to the Examples below but, the inventive concept is not limited to the Examples.

Method of Testing

First, an acid value and a weight average molecular weight of reaction products obtained from each process of the Example 1 below were evaluated according to the methods described below.

(1) An Acid Value

An acid value was measured according to DIN EN 12634 and a mixture of 10 parts by volume of N,N-dimethylsulfoxide, 8 parts by volume of propane-2-ol, and 7 parts by volume of toluene was used as a solvent.

A sample was heated to a temperature of 50° C., a single-rod electrode was used in a circuit, and a container containing the sample was filled with potassium chloride. Tetramethyl ammonium hydroxide was used as a standard solution.

(2) A Weight Average Molecular Weight

A weight average molecular weight was measured by using a gel permeation chromatography (GPC, Agilent HP 1100) and polystyrene was used as a standard material. A column was prepared by continuously connecting a PLgel (5 um) Mixed-D (available from Phenomenex) and a PLgel (10 um) Mixed-B, and the weight average molecular weight was measured under the conditions of a flow rate of 1 ml/min by setting a temperature of the column and the detector at 35° C.

EXAMPLE 1

Preparing a Biodegradable Poly(1,4-butylene succinate) (PBS)

[A First Slurry Tank]

In a first slurry tank, 1,4-butanediol and succinic acid were added at a molar ratio of 1.15:1.0 and the 1,4-butanediol and succinic acid were agitated and mixed at a temperature of 60° C. to prepare a slurry. The slurry prepared in the first tank was continuously flowed into a second slurry tank. The second slurry tank is for providing continuity by introducing the slurry into a first esterification reactor at a stable flow rate and an internal temperature of the second slurry tank was maintained at a temperature of about 75° C.

[Esterification Reaction]

1,4-butanediol and succinic acid were reacted while continuously introducing the slurry of the second slurry tank to an esterification reactor (a capacity of the reactor was about 0.49 m$^3$). Here, flow rate was about 33.8 kg/h, a reaction temperature was about 175° C., and pressure was normal pressure.

As the esterification reactor, a vertical-type reactor in which a pitched paddle type agitator, available from Hado Corp, is provided was used (see http://www.hado.co.kr/default1.html).

Triphenyl phosphate, tetra-n-butyl titanate, and cobalt acetate were added to a reaction mixture of the esterification reactor.

Tetra-n-butyl titanate and triphenyl phosphate were each pre-mixed with 1,4-butanediol to have a concentration of about 10 wt %.

A flow rate was adjusted such that the content of the triphenyl phosphate was about 0.1 g (3.06×10$^{-4}$ mol) based on 1 mole of succinic acid and the content of the tetra-n-butyl titanate was about 0.3 g (8.815×10$^{-4}$ mol) based on 1 mole of succinic acid.

Cobalt acetate was added to the reaction mixture in a content of 0.1 g (5.65×10$^{-4}$) based on 1 mole of succinic acid.

Water, by-product of the esterification reaction, was removed through a condenser.

A level (a filling capacity of the reactor) and a flow rate were adjusted such that residence time of the reaction mixture was 6 hours.

An acid value of an ester obtained from the reaction was 70 mg KOH/g.

[A First Polycondensation Reaction]

A preliminary polymer reaction was performed while continuously introducing a product of an esterification reaction in the first esterification reactor to a first polycondensation reactor. Here, a flow rate was about 26 kg/h, a reaction temperature was about 240° C., and a degree of vacuum was about 25 torr.

A vertical-type reactor in which an anchor-type agitator is provided, available from Hitachi Plant Technology, was used as the first polycondensation reactor.

A level (a filling capacity of the reactor) was adjusted such that residence time of the reaction mixture in the first polycondensation reactor (a capacity of the first polycondensation reactor was about 0.4 m$^3$) was about 1.5 hours.

An acid value of the reaction product was about 7 mg KOH/g and a weight average molecular weight was about 8,000.

[A Second Polycondensation Reaction]

A second polycondensation reaction was performed while continuously introducing a preliminary polymer prepared from the first polycondensation reaction to a second polycondensation reactor (a capacity of the second polycondensation reactor was about 0.24 m$^3$). Here, a flow rate was about 26 kg/h, a reaction temperature was about 240° C., a degree of vacuum was about 5 torr, and a level (a filling capacity of the reactor) and flow rate were adjusted such that residence time of the reaction mixture was about 3 hours.

A horizontal-type reactor in which a single agitator is horizontally arranged, available from Hitachi Plant Technology, was used as the second polycondensation reactor.

An acid value of the reaction product of the second polycondensation was 5 mg KOH/g and a weight average molecular weight was 100,000.

[A Third Polycondensation Reaction]

A third polycondensation reaction was performed while continuously introducing a product of the second polycondensation reaction to a third polycondensation reactor. Here, a flow rate was about 26 kg/h, a reaction temperature was about 240° C., and a degree of vacuum was about 1.5 torr.

A horizontal-type reactor in which two agitators are horizontally arranged, available from Hitachi Plant Technology, was used as the third polycondensation reactor.

A level (a filling capacity of the reactor) and flow rate were adjusted such that residence time of the reaction mixture in the third polycondensation reactor (a capacity of the third polycondensation reactor was about 0.192 m$^3$) was about 1.5 hours.

A final polymer whose reaction was completed was passed through a cooling water bath to be cooled and solidified, cut by using a cutter, and then dried to obtain poly(1,4-butylene succinate) (PBS), which is a desired biodegradable polyester.

An acid value of the PBS was about 4 mg KOH/g and weight average molecular weight was about 220,000.

The ester reactor, the first polycondensation reactor, the second polycondensation reactor, and the third polycondensation reactor used in Examples 2, 3, and Comparative Example 1 below were the same as the reactor used in Example 1.

EXAMPLE 2

The same method was used to obtain PBS as in Example 1 except for reacting 1,4-butanediol with succinic acid in an esterification reactor by adjusting a temperature to 185° C. and residence time of the reaction mixture to 5 hours.

EXAMPLE 3

The same method was used to obtain PBS as in Example 1 except for reacting 1,4-butanediol with succinic acid in an esterification reactor by adjusting a temperature to 160° C. and residence time of the reaction mixture to 7 hours.

COMPARATIVE EXAMPLE 1

The same method was used to obtain PBS as in Example 1 except for reacting 1,4-butanediol with succinic acid in an esterification reactor by adjusting a temperature to 195° C. and residence time of the reaction mixture to 4.5 hours.

EVALUATION EXAMPLE 1

Comparing the Amount of 1,4-butanediol Used Based on 1 Mole of Succinic Acid

In the method of preparing biodegradable PBS according to Examples 1-3 and Comparative Example 1, the amount of 1,4-butanediol used in preparing the biodegradable PBS was compared and shown in Table 1 below.

TABLE 1

|  | mole of 1,4-butanediol based on 1 mole of succinic acid |
|---|---|
| Example 1 | 1.15 |
| Example 2 | 1.15 |
| Example 3 | 1.15 |
| Comparative Example 1 | 1.7 |

Referring to Table 1 above, it may be concluded that when an ester was prepared according to Examples 1-3, the amount of 1,4-butanediol used, which was needed for preparing a biodegradable PBS, decreased. Accordingly, it was confirmed that when the ester was prepared according to the Examples 1-3, a reaction in which 1,4-butanediol changed into tetrahydrofuran during an ester reaction decreased.

EVALUATION EXAMPLE 2

Comparing the Amount of THF Generated

The amount of THF generated based on 1 mole of succinic acid in the ester reaction of Examples 1-3 and Comparative Example 1 was measured, and the results thereof are shown in Table 2 below.

TABLE 2

|  | The amount of THF generated based on 1 mole of succinic acid (mol) |
|---|---|
| Example 1 | 0.05 |
| Example 2 | 0.09 |
| Example 3 | 0.02 |
| Comparative Example 1 | 0.58 |

Referring to Table 2, when an ester reaction was performed according to Examples 1-3, the amount of THF generated was substantially reduced compared to Comparative Example 1.

According to an embodiment, as side reactions of 1,4-butanediol are inhibited, an amount of 1,4-butanediol used decreases compared with a conventional method and an amount of 1,4-butanediol additionally introduced during the preparation process substantially decreases. Accordingly, manufacturing cost of the biodegradable aliphatic polyester decreases. Also, the inventive concept is suitable for environmental protection purposes because an amount of THF transformed during the ester manufacturing process decreases and is easier to work with because generation of byproducts during the ester reaction is inhibited, thereby decreasing vacuum line problems. Furthermore, a large-scale production is possible because the biodegradable aliphatic polyester may be continuously prepared.

While the inventive concept has been particularly shown and described with reference to exemplary embodiments thereof, it will be understood that various changes in form and details may be made therein without departing from the spirit and scope of the following claims.

The invention claimed is:

1. A method of continuous production of a biodegradable aliphatic polyester, the method comprising:
   continuously performing an esterification reaction of a mixture comprising an aliphatic dihydroxy compound and aliphatic dicarboxylic acid under the conditions of a temperature of about 160° C. to about 185° C. and residence time of reactants of about 3 hours to about 8 hours;
   continuously performing a first polycondensation reaction of the ester to obtain a preliminary polymer; and
   continuously performing a polycondensation reaction of the preliminary polymer.

2. The method of claim 1, wherein an amount of the aliphatic dihydroxy compound used is about 1.1 moles to about 1.5 moles based on 1 mole of the aliphatic dicarboxylic acid.

3. The method of claim 1, wherein the continuously performing the polycondensation reaction of the preliminary polymer comprises:
   continuously performing a second polycondensation reaction of the preliminary polymer; and
   continuously performing a third polycondensation reaction of a product obtained from the second polycondensation reaction.

4. The method of claim 3, wherein the second polycondensation reaction is performed under the conditions of a temperature of about 220° C. to about 250° C., a degree of vacuum of about 2 torr to about 7 torr, and residence time of a reaction mixture of about 1 hour to 4 hours.

5. The method of claim 3, wherein the third polycondensation reaction is performed under the conditions of a temperature of about 220° C. to about 250° C., a degree of vacuum of about 0.5 torr to about 2 torr, and residence time of the reaction mixture of about 1 hour to 3 hours.

6. The method of claim 1, wherein the first polycondensation reaction is performed under the conditions of a temperature of about 220° C. to about 250° C., a degree of vacuum of about 10 torr to about 50 torr, and residence time of a reaction mixture of about 1 hour to 3 hours.

7. The method of claim 1, wherein the mixture comprising the aliphatic dihydroxy compound and the aliphatic dicarboxylic acid further comprises at least one of a group consisting of a catalyst, a heat stabilizer, a branching agent, a color stabilizing agent, and a color control agent.

8. The method of claim 1, wherein the aliphatic dihydroxy compound is an ethanediol, 1,2-propanediol, 1,3-propanediol, 1,2-butanediol, 1,4-butanediol, 1,5-pentanediol, 1,6-hexanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, or a mixture thereof, and the aliphatic dicarboxylic acid is malonic acid, succinic acid, glutaric acid, 2-methyl glutaric acid, 3-methyl glutaric acid, adipic acid, pimelic acid, suberic acid, azelaic acid, sebacic acid, undecandioic acid, dodecandioic acid, brassylic acid, tetradecandioic acid, fumaric acid, 2,2-dimethylglutaric acid, maleic acid, itaconic acid, 2-5-norbornane dicarboxylic acid, or a mixture thereof.

\* \* \* \* \*